(12) United States Patent
Henzinger et al.

(10) Patent No.: US 7,886,217 B1
(45) Date of Patent: Feb. 8, 2011

(54) IDENTIFICATION OF WEB SITES THAT CONTAIN SESSION IDENTIFIERS

(75) Inventors: Monika Henzinger, Menlo Park, CA (US); Matthias Ruhl, Cupertino, CA (US)

(73) Assignee: Google Inc., Mountain View, CA (US)

( * ) Notice: Subject to any disclaimer, the term of this patent is extended or adjusted under 35 U.S.C. 154(b) by 1703 days.

(21) Appl. No.: 10/672,248

(22) Filed: Sep. 29, 2003

(51) Int. Cl.
*G06F 17/00* (2006.01)
(52) U.S. Cl. ...................... 715/205; 715/234
(58) Field of Classification Search .............. 715/502, 715/501.1, 205, 234
See application file for complete search history.

(56) References Cited

U.S. PATENT DOCUMENTS

| | | | |
|---|---|---|---|
| 6,665,658 B1 * | 12/2003 | DaCosta et al. ............ | 707/3 |
| 6,952,730 B1 | 10/2005 | Najork et al. | |
| 2002/0007411 A1 | 1/2002 | Shaked et al. | |
| 2003/0018779 A1 * | 1/2003 | Hughes et al. ............ | 709/224 |
| 2004/0117349 A1 | 6/2004 | Moricz | |
| 2004/0133848 A1 | 7/2004 | Hunt et al. | |
| 2004/0158429 A1 | 8/2004 | Bary et al. | |
| 2004/0177015 A1 | 9/2004 | Galai et al. | |
| 2007/0112960 A1 | 5/2007 | Joy et al. | |
| 2008/0052169 A1 | 2/2008 | O'Shea et al. | |
| 2008/0201344 A1 | 8/2008 | Levergood et al. | |

FOREIGN PATENT DOCUMENTS

WO    WO 03017023 A2 *    2/2003

OTHER PUBLICATIONS

Loke et al., "Logic Programming with the World-Wide Web", p. 235-245, Hypertext 1996, ACM.*
Verity Ultraseek, Support FAQ #1037, created Jan. 2002, p. 1-2.*
DeRoure, et al., "Investigating Link Service Infrastructures", copyright 2000, ACM, p. 67-76.*
Miller, et al., "SPHINX: A Framework for Creating Personal, Site-Specific Web Crawlers", Proceedings of the Seventh International World Wide Web Conference, Brisbane, Australia, Apr. 1998, p. 1-13.*
Seda, C., "Making Dynamic and E-Commerce Sites Search Engine Friendly", Search Engine Watch, http://searchenginewatch.com/searchday/article.php/2161, published Oct. 29, 2002, p. 1-5.*
Quigo, Inc., "Quigo, Inc. Unveils Deep Web Search Technologies", press release dated Aug. 15, 2001, p. 1-2.*
Search Tools Consulting, www.searchtools.com, "Generating Simple URLs for Search Engines", Jul. 2003, p. 1-6.*
Sun Microsystems, The Java Tutorial, including sections on "Session Tracking", "Working with URLs", and "Parsing a URL", p. 1-9.*
Co-pending U.S. Appl. No. 10/743,547, filed Dec. 23, 2003, entitled: "Content Retrieval From Sites That Use Session Identifiers," 25 page specification, 7 sheets of drawings.

* cited by examiner

*Primary Examiner*—Amelia Rutledge
(74) *Attorney, Agent, or Firm*—Harrity & Harrity, LLP

(57) ABSTRACT

Web sites are analyzed to determine whether the web sites are embedding session identifiers in web documents. The analysis is based on a comparison of in-host links of multiple copies of a document from a web site. Rules governing the insertion of session identifiers for the web site may be determined and used to assist in crawling the web site.

30 Claims, 8 Drawing Sheets

IDENTIFICATION OF WEB SITES THAT CONTAIN SESSION IDENTIFIERS

BACKGROUND OF THE INVENTION

A. Field of the Invention

The present invention relates generally to content retrieval on the world wide web, and more particularly, to automated web crawling.

B. Description of the Related Art

The World Wide Web ("web") contains a vast amount of information. Search engines assist users in locating desired portions of this information by cataloging web pages. Typically, in response to a user's request, the search engine returns references to documents relevant to the request.

Search engines may base their determination of the user's interest on search terms (called a search query) entered by the user. The goal of the search engine is to identify links to high quality relevant results based on the search query. Typically, the search engine accomplishes this by matching the terms in the search query to a corpus of pre-stored web documents. Web documents that contain the user's search terms are considered "hits" and are returned to the user.

The corpus of pre-stored web documents may be stored by the search engine as an index of terms found in the web pages. Documents that are to be added to the index may be automatically located by a program, sometimes referred to as a "spider," that automatically traverses ("crawls") web documents based on the uniform resource locators (URLs) contained in the web documents. Thus, for example, a spider program may, starting at a given web page, download the page, index the page, and gather all the URLs present in the page. The spider program may then repeat this process for the web pages referred to by the URLs. In this way, the spider program "crawls" the world wide web based on its link structure.

Some web sites track users as they download different pages on the web site. User tracking is useful for identifying user behavior, such as identifying purchasing behavior by tracking the user through various web site page requests on a shopping orientated web site.

Two methods are commonly used to track user behavior: use of cookies to maintain information and embedding session identifiers in the uniform resource locators (URLs) in the web pages presented to the user. An embedded session identifier, in particular, may include a string of random characters embedded in the URLs returned to the user. Specifically, when the user requests a page of a web site with a URL that does not have a session identifier, a session identifier is created for this user and the user receives a version of the entry web page in which links on the page are annotated by the session identifier. When the user selects a link, the web server parses the session identifier from the URL, attaches the same session identifier to the local links on the next generated web page, and returns that web page to the user. The web server continues to parse and attach the session identifiers as long as the user requests a page whose URL has a session identifier.

As an example of the use of session identifiers, consider the situation of a web spider crawling a first web site that contains multiple URLs that do not include session identifiers. The spider may decide to crawl these URLs, which may point to a second web site, one after the other. For each URL it requests, the spider may return a page whose URLs are annotated with a session identifier. Each requested page, however, may include a different session identifier. The spider would then extract these annotated URLs from the pages and if two URLs are identical except for the session identifier the spider would not recognize this since the URL strings are different. The spider would thus repeatedly crawl the same web pages, thus wasting the spider's time and bandwidth and filling the search engine's index with duplicate pages, thus wasting storage space.

Thus, there is a need in the art to effectively identify web sits that contain session identifiers in order to improve web crawling.

SUMMARY OF THE INVENTION

The present invention is directed to techniques for identifying web sites that use session identifiers.

A first aspect of the invention is directed to a method for crawling documents. The method includes receiving a uniform resource locator (URL) and determining whether the URL is associated with a web site that uses session identifiers. The determination is made, at least in part, on a comparison of a portion of URLs that change between different copies of a web document downloaded from the web site.

A second aspect consistent with the invention is directed to a method for identifying web sites that use session identifiers. The method includes downloading at least two different copies of at least one web document from a web site, extracting URLs from the two different copies of the web document, comparing the extracted URLs of the two different copies of the web document, and determining whether the web site uses session identifiers based on the comparison.

Yet another aspect of the invention includes a device comprising a spider component configured to crawl web documents associated with at least one web site. Further, a session identifier component determines whether the web site uses session identifiers based on a calculation of a portion of URLs that change between different copies of at least one web document downloaded from the web site.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

As described herein, web sites that use session identifiers are determined. These web sites may be further analyzed to determine rules that describe the session identifier. A web crawler may use this information to enhance web crawling.

Exemplary Network Overview

Figure 1:
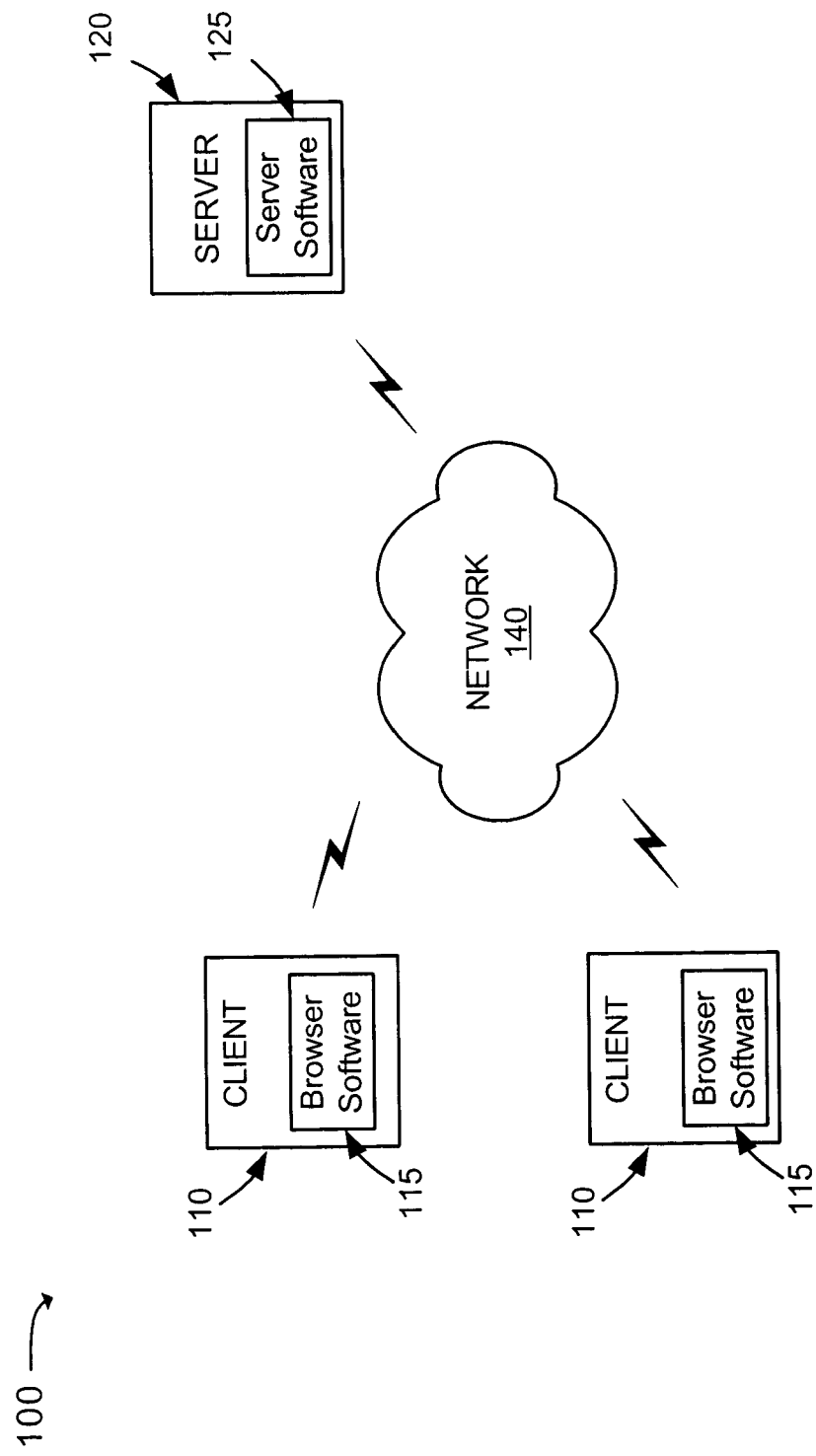
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to one or more servers 120 via a network 140. Network 140 may include a local area network (LAN), a wide area network (WAN), a telephone network, such as the Public Switched Telephone Network (PSTN), an intranet, the Internet, or a combination of networks. Two clients 110 and a server 120 have been illustrated as connected to network 140 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these device. Server 120 may include server entities that process, search, and/or maintain documents in a manner consistent with the principles of the invention. Clients 110 and server 120 may connect to network 140 via wired, wireless, or optical connections.

Clients 110 may include client software such as browser software 115. Browser software 115 may include a web browser such as the existing Microsoft Internet Explorer or Netscape Navigator browsers. For example, when network 140 is the Internet, clients 110 may navigate the web via browsers 115.

Server 120 may operate as a web server and include appropriate web server software 125. In one implementation, web server software 125 may function as a search engine, such as a query-based web page search engine. In general, in response to client requests, search engine 125 may return sets of documents to clients 110. The documents may be returned to clients 110 as a web page containing a list of links to web pages that are relevant to the search query. This list of links may be ranked and displayed in an order based on the search engine's determination of relevance to the search query. Although server 120 is illustrated as a single entity, in practice, server 120 may be implemented as a number of server devices.

A document, as the term is used herein, is to be broadly interpreted to include any machine-readable and machine-storable work product. A document may be an email, a file, a combination of files, one or more files with embedded links to other files, a news group posting, a web advertisement, etc. In the context of the Internet, a common document is a Web page. Web pages often include content and may include embedded information (such as meta information, hyperlinks, etc.) and/or embedded instructions (such as Javascript, etc.).

Exemplary Client/Server Architecture

Figure 2:
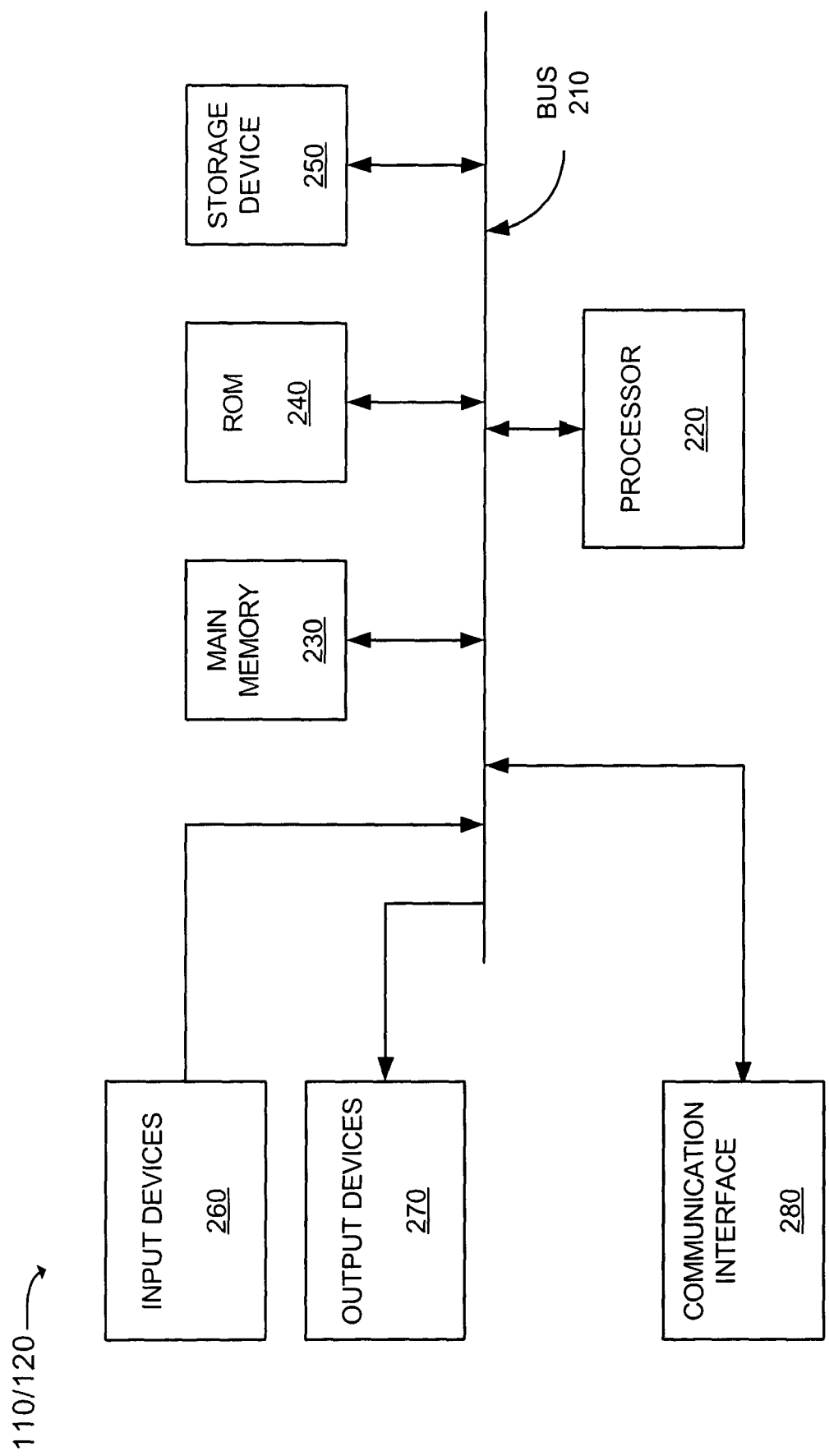
FIG. 2 is an exemplary diagram of a client or server device according to an implementation consistent with the principles of the invention.

FIG. 2 is an exemplary diagram of a client 110 or server 120 according to an implementation consistent with the principles of the invention. Client/server 110/120 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of client/server 110/120.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit a user to input information to client/server 110/120, such as a keyboard, a mouse, a pen, voice recognition and/or biometric mechanisms, etc. Output device(s) 270 may include one or more conventional mechanisms that output information to the user, including a display, a printer, a speaker, etc. Communication interface 280 may include any transceiver-like mechanism that enables client 110/120 to communicate with other devices and/or systems. For example, communication interface 280 may include mechanisms for communicating with another device or system via a network, such as network 140.

The software instructions defining server software 125 and browser software 115 may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

As mentioned, server software 125 may implement a search engine that, based on a user query, returns a list of links to documents that the server software 125 considers to be relevant to the search.

Server Software 125

Figure 3:
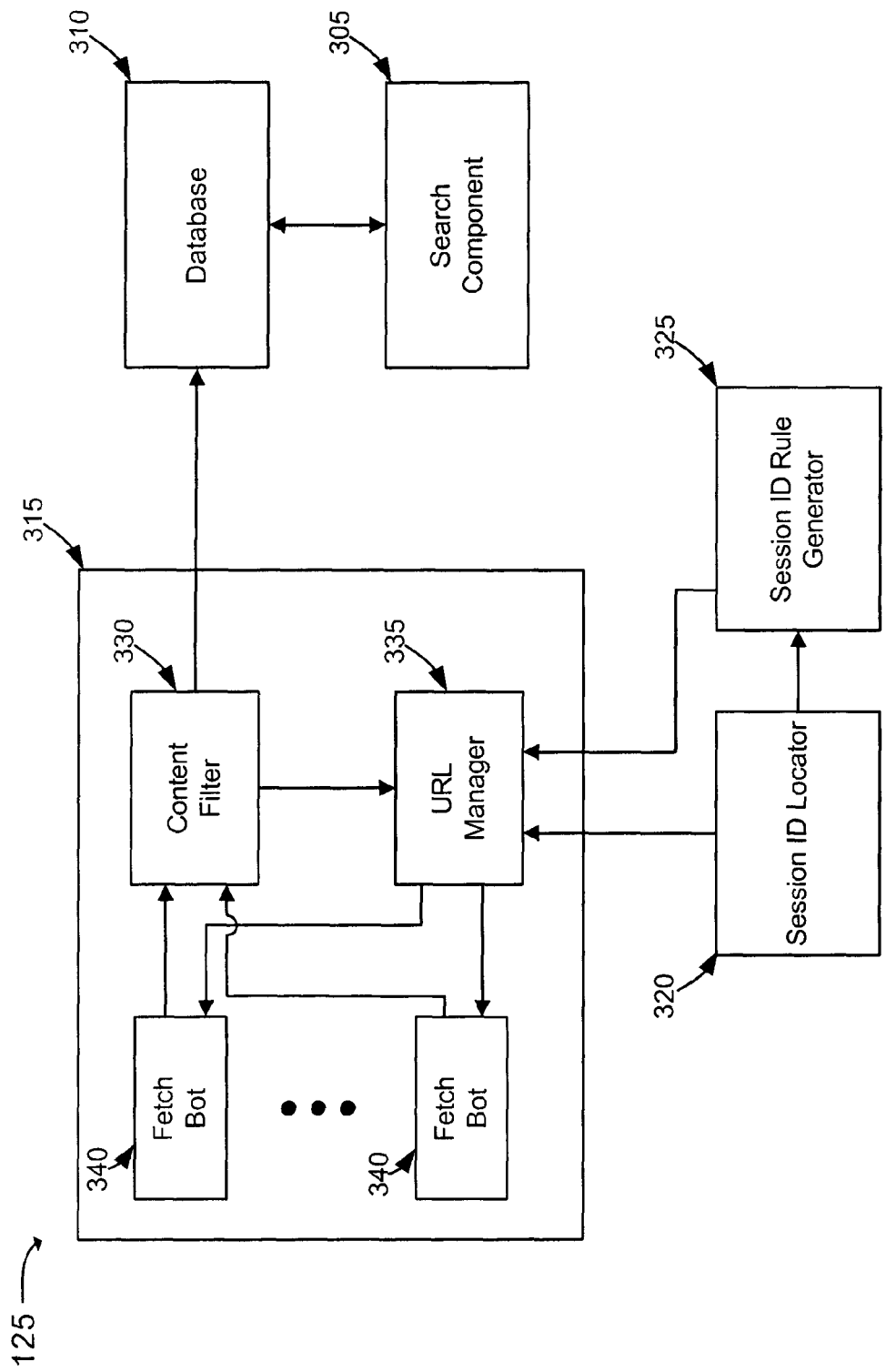
FIG. 3 is an exemplary functional block diagram illustrating an implementation of the server software shown in FIG. 1.

FIG. 3 is an exemplary functional block diagram illustrating an implementation of server software 125. Server software 125 may include a search component 305, a database component 310, a spider component 315, a session identifier (ID) locator 320, and a session ID rule generator 325. In general, search component 305 may receive user search queries from clients 110, search database 310 based on the search queries, and return a list of links (e.g., URLs) of relevant documents to the client 110. The list of links may also include information that generally attempts to describe the contents of the web documents associated with the links. The list of links may be ordered based on ranking values, generated by search component 305, which rates the links based on relevance.

Database component 310 may store an index of the web documents that have been crawled by spider component 315. Database component 310 may be updated as new web documents are crawled and added to database component 310. Database component 310 may be accessed by search component 305 when responding to user search queries.

Spider component 315 may crawl documents available through network 140. Spider component 315 may include content filter 330, URL manager 335, and fetch bots 340. In general, fetch bots 340 may download content referenced by URLs. The URLs that are to be downloaded may be given to fetch bots 340 by URL manager 335. URL manager 335 may keep track of the URLs that have been downloaded and what URLs are to be downloaded. URL manager 335 may generate a "fingerprint" of each URL it receives by, for example, applying a hash function to the URL. The fingerprint can be used to quickly identify if a later-received URL is identical to one previously downloaded. Content filter 330 may receive content downloaded by fetch bots 340 and destined for database component 310. Content filter 330 may process the content downloaded by fetch bots 340 to, for example, extract URLs from the content for URL manager 335. Content filter 330 may forward the downloaded content to database component 310.

Session ID locator 320 may operate to identify web sites that use session identifiers. The identified web sites may be communicated to URL manager 335, which may use this information when determining web documents to crawl. For instance, if the URL for a web document refers to a web host that uses session identifiers, URL manager 335 may first remove the session identifier from the URL before fingerprinting and/or storing the URL.

Session ID rule generator 325 may generate rules for URLs of web sites identified by session ID locator 320. These rules may describe how a particular web site inserts session identifiers into URLs that are embedded in web pages served by the web site and that refer to in-host resources (i.e., URLs that refer back to the same web site). URL manager 335 may use these rules to extract or insert session identifiers into URLs for a particular web site. The operation of session ID locator 320 and session ID rule generator 325 are described in more detail below.

Although search component 305, database component 310, spider component 315, session ID locator 320, and session ID rule generator 325 are illustrated in FIG. 3 as all being part of server software 125, one of ordinary skill in the art will recognize that these components could be implemented on separate computing devices or clusters of computing devices. Spider component 315 and search component 305, for example, may be implemented independently of one another. Additionally, session ID locator 320 and session ID rule generator 325 may also be implemented independently of spider component 315, database component 310, and/or search component 305.

Figure 4:
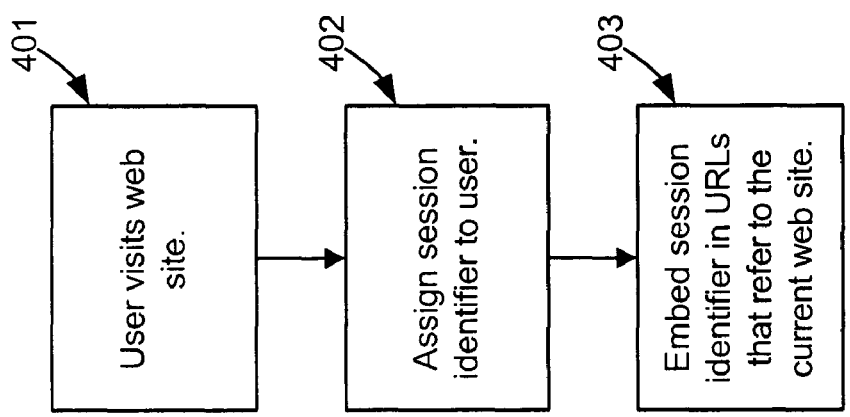
FIG. 4 is a flow chart illustrating the use of session identifiers by a web server.

Before describing the operation of the components in FIG. 3 in greater detail, it may be helpful to describe the way in which session identifiers are commonly used. FIG. 4 is a flow chart illustrating the use of session identifiers by a web server. As mentioned, session identifiers may be used to track the user of a client 110 as the user interacts with a particular host web site.

A user may begin by browsing a web site using browser software 115 (act 401). The web site may assign a session identifier to the user (act 402). The session identifier may be, for example, a string of characters, such as a random string of sixteen or more hex-decimal characters. A web site that uses session identifiers to track user actions is typically a web site that includes multiple different possible web pages to which the user may navigate. A web shopping site, for instance, may contain hundreds or thousands of possible web pages to which the user may navigate. Typically, after accessing the main web page for the shopping site, the user will navigate to other web pages in the shopping site by selecting URLs on the main web page or from later served web pages. For each web page returned to the user, the web site may include the session identifier in the URLs that point to other web pages on the web site (act 403). When the user attempts to access one of these URLs, the web site uses the session identifier to identify the user with the user's previous site accesses.

Figure 5:
FIG. 5 is a diagram illustrating a series of exemplary URLs that include session identifiers.

FIG. 5 is a diagram illustrating a series of exemplary URLs that include session identifiers. A number of URLs 501-504 are illustrated in FIG. 5. In this example, URLs 501-504 are URLs embedded in a web page for "somecompany.com." Each URL includes a session identifier 510 ("12341234"). If the user selects URL 502, for instance, the user's browser program 115 may contact "somecompany.com" and request the web page "/12341234/page1.htm." The "somecompany.com" web site may use session identifier 510, which the web server strips from URL 502, to identify the user's session. The web server also returns the actual web page, "page1.htm." The URLs within "page1.htm" that refer to other web pages at "somecompany.com" (i.e., the in-host URLs) may also contain session identifier 510.

Although session identifiers were described above as a specially inserted strings of characters, in general, any portion of a URL that doesn't reference content can be potentially used as a session identifier. Content, in this sense, does not necessarily mean that the web documents need to be exactly the same to be considered as having the same content. For example, web documents that are the same but for different color schemes, different advertisement links, or different navigation links may still be considered as having the same content.

Figure 6:
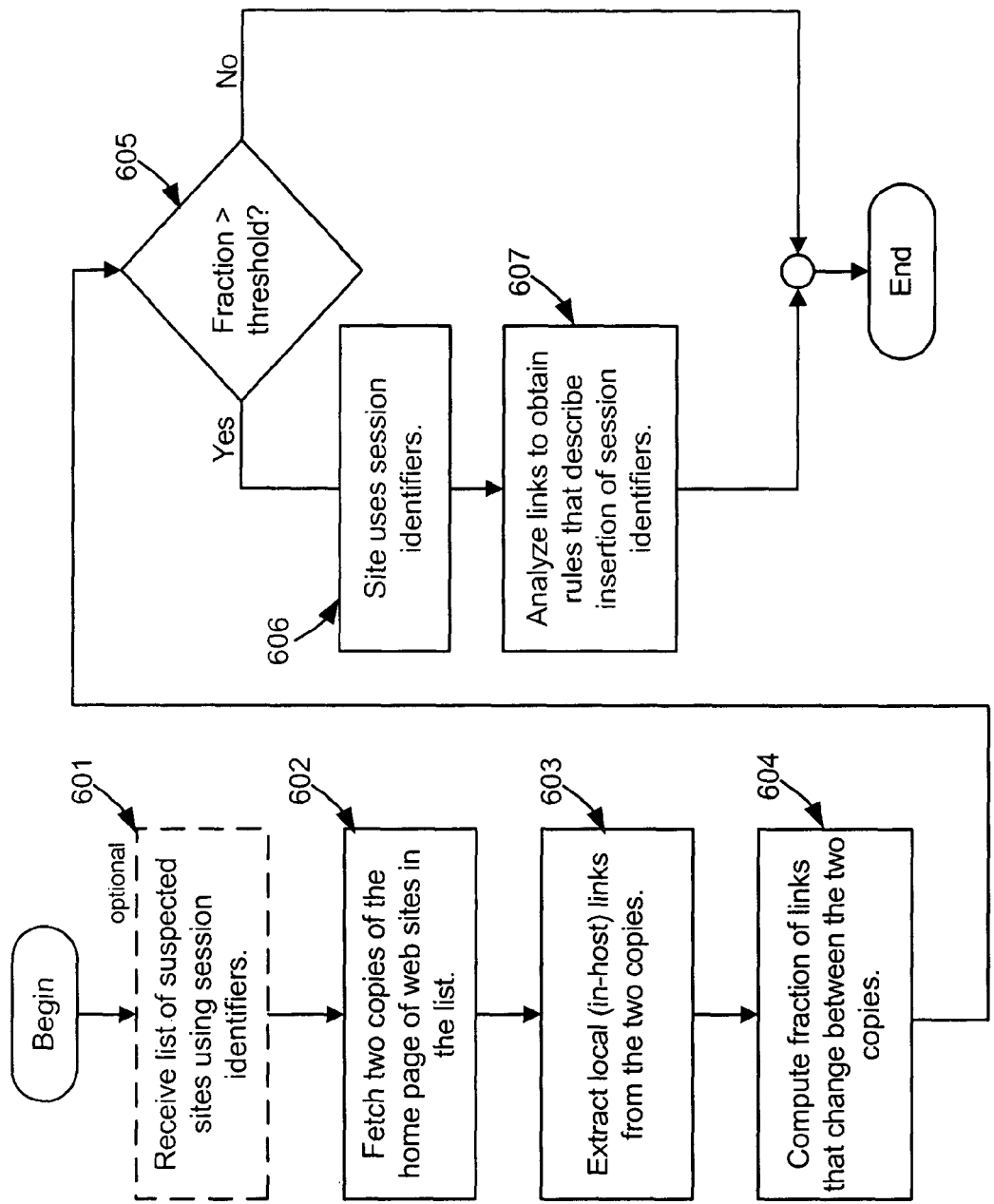
FIG. 6 is a flow chart illustrating operations consistent with aspects of the invention through which the session ID locator shown in FIG. 3 may classify web sites as sites that use session identifiers.

FIG. 6 is a flow chart illustrating operations consistent with aspects of the invention through which session ID locator 320 may classify web sites as sites that use session identifiers.

Session ID locator 320 may begin with a list of web sites that are suspected to use session identifiers (act 601). In one implementation, the list may be manually generated and supplied to session ID locator 320. In alternate implementations, session ID locator 320, or another component such as URL manager 335, may compile the list automatically. URL manager 335, for example, may add entries to the list that correspond to web sites suspected to contain session identifiers that it is attempting to crawl. For example, a web site for which URL manager 335 receives an exceptionally large number of "different" links may be considered to be a suspicious web site.

For web sites in the list of suspicious sites, session ID locator 320 may fetch (download) the home page of the corresponding web site two different times (act 602). The home page of a web site can normally be accessed by initiating a hyper-text transfer protocol (HTTP) request with the host name. For example, the home page of the web site corresponding to the host "google.com" may be downloaded with the HTTP request "http://www.google.com". In some implementations, other web documents at the web sites, instead of the home page, may be fetched instead.

If the web site under consideration is one that uses session identifiers, each of the two requests in act 602 should be returned with a different set of session identifiers. Thus, for example, with reference to FIG. 5, the first request to "somecompany.com" may return a web page with links 501-504, each including the session identifier "12341234." The second request to "somecompany.com" may return a web page with links similar to links 501-504, but including a different session identifier, such as "12345678."

Session ID locator 320 may extract the set of local (also referred to as in-host) links (URLs) from the web pages downloaded in act 602 (act 603). Local links are defined as links that refer back to the web host. The exemplary links 501-504 are all local links because they all refer to documents at "somecompany.com." If one of the links downloaded from the home page of "somecompany.com" referred to another web host, such as the exemplary link "http://someothercompany.com/home.htm," this link may not be considered a local link by session ID locator 320.

Figure 7:
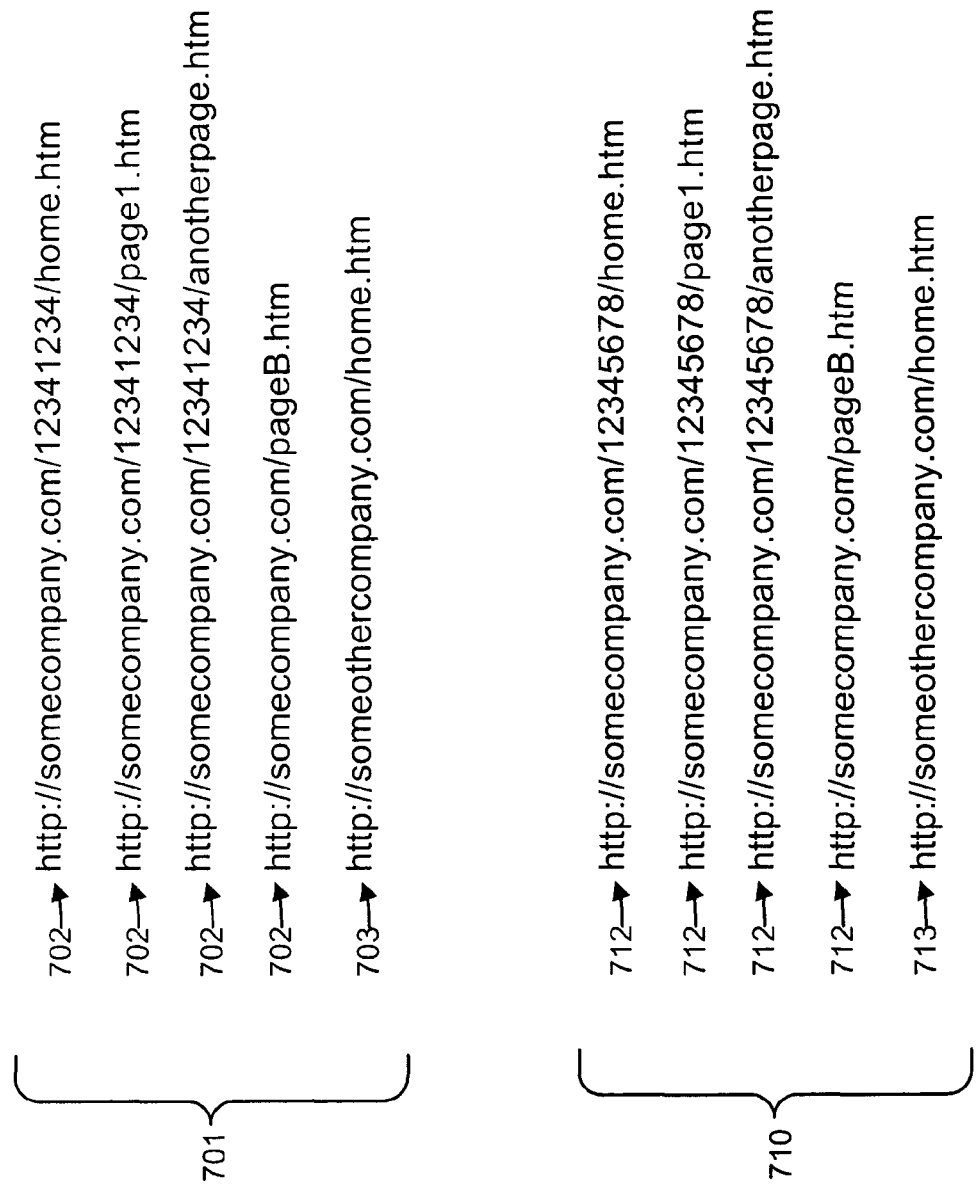
FIG. 7 is a diagram illustrating exemplary sets of links that correspond to a first and second set of links downloaded from a home page.

FIG. 7 is a diagram illustrating exemplary sets of links that correspond to a first and second set of links downloaded from a home page. In this hypothetical example, the homepage is given as "http://somecompany.com/home.htm." The first set of links, set 701, includes four in-host links 702 and an external link 703. The second set of links, set 710, also includes four in-host links 712 and external link 713.

Session ID locator 320 may next compute the fraction of links that change by comparing the four in-host links 702 to the four in-host links 712 (act 604). In this example, the first three of the four links in sets 701 and 710 contain session identifiers that change between sets 701 and 710. The last link in sets 701 and 710 does not change between sets. Accordingly, three out of the four links (75%) change between links 701 and 710.

If the fraction determined in act 604 is above a predetermined threshold, session ID locator 320 may classify the corresponding web site as one that uses session identifiers (acts 605 and 606). The value to use as the threshold may be determined based on manual inspection of typical values calculated for a number of web sites.

Other techniques may be used to classify web sites as ones that use session identifiers. For example, if there is at least one link that changes between the two versions of the web page and the content underlying these two links are duplicates or near-duplicates of one another, the web site may be considered to be one that uses session identifiers. Another technique may be to crawl URLs from a given web site until a certain number of pages have been crawled (e.g., 100). At this point, near-duplicate pages could be determined for the crawled pages. If the portion of near-duplicates is greater than a predetermined level, the web site could be considered to be one that uses session identifiers.

For sites that session ID locator 320 determines to use session identifiers, session ID rule generator 325 may analyze the links with session identifiers to determine a rule(s) that the site uses to insert the session identifiers (act 607). For the "somecompany.com" example shown in FIG. 7, for example, the rule may be determined as "insert the session identifier after the host name and delineate the session identifier with '/' characters." In some implementations, session ID rule generator 325 may be implemented manually by human operators. In other implementations, automated pattern classification techniques may be used to implement session ID rule generator 325.

Figure 8:
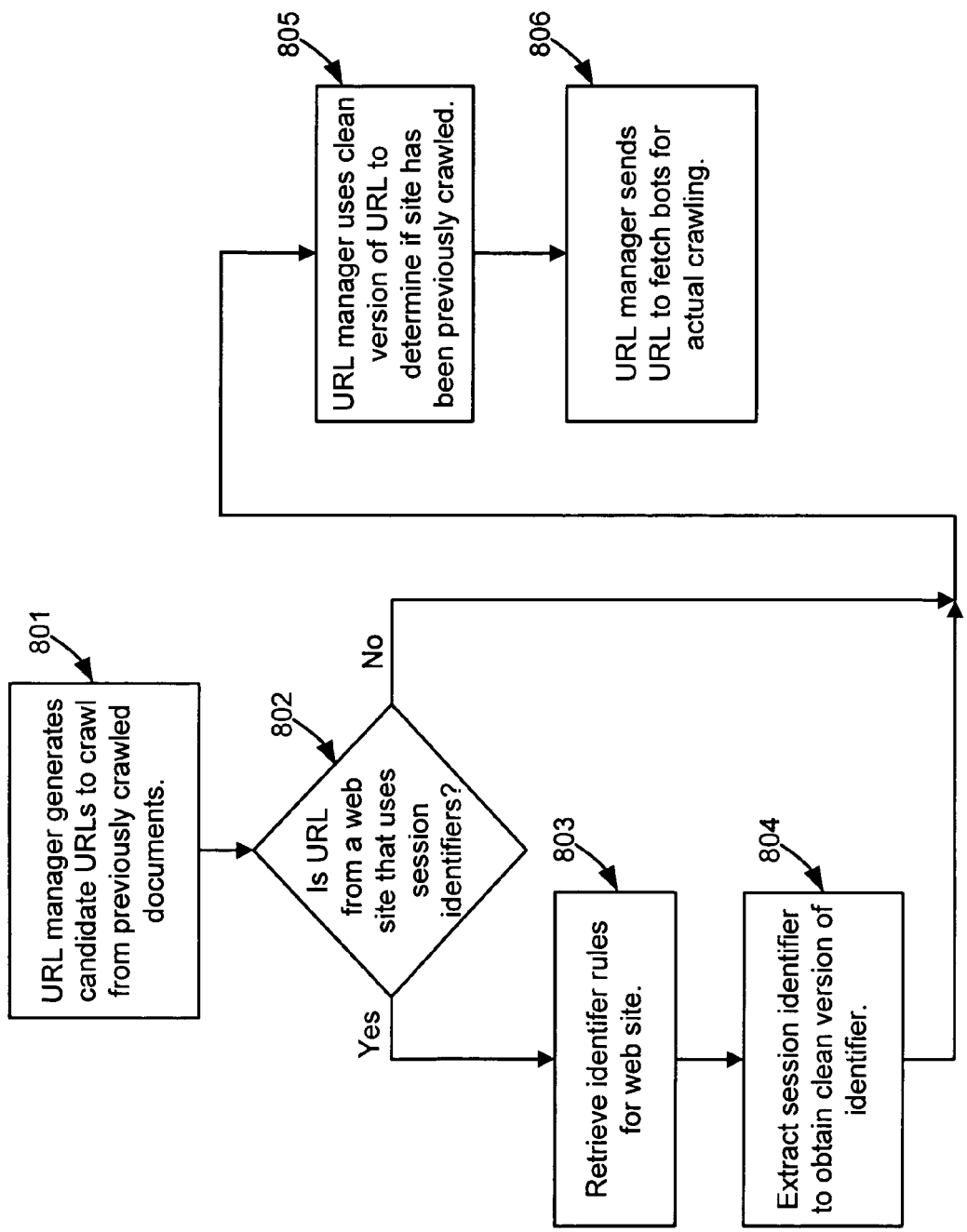
FIG. 8 is a flowchart illustrating operations for crawling the web consistent with aspects of the invention.

FIG. 8 is a flowchart illustrating operations for crawling the web consistent with aspects of the invention. URL manager 335 may begin by identifying candidate URLs to crawl from previously crawled documents (act 801). The candidate URLs may include any URLs that were previously extracted from downloaded web documents. Alternatively, candidate URLs could be externally input to URL manager 335.

Using the techniques discussed above, session ID locator 320 may determine if a candidate URL is from a web site that uses session identifiers (act 802). If the URL is from a site that uses session identifiers, URL manager 335 may retrieve the session identifier rules generated by session ID rule generator 325 (act 803). URL manager 335 may use the rules to extract the session identifier from the candidate URL, thus generating a clean version of the URL (act 804).

URL manager 335 may determine if the candidate URL has been previously crawled by comparing the clean version of the candidate URL to clean versions of URLs that were previously crawled (act 805). The comparison may be based on a fingerprint of the URLs.

Candidate URLs that URL manager 335 determines should be crawled may be transmitted to fetch bots 340 for downloading (act 806).

CONCLUSION

As discussed above, web sites that use session identifiers may be automatically identified by comparing in-host links to multiple copies of documents from the web sites. Knowing that a particular web site uses session identifiers can enhance web crawling.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although the above discussion relating to determining if a web site uses session identifiers was described with reference to a single web site, a web site can be broadly defined to cover sites served by multiple web hosts. In this situation, the host name part of the URL for the web site may be different.

No element, act, or instruction used in the description of the present application should be construed as critical or essential to the invention unless explicitly described as such. Also, as used herein, the article "a" is intended to include one or more items. Where only one item is intended, the term "one" or similar language is used.

What is claimed is:

1. A method for crawling documents, performed by one or more server devices, the method comprising:
   receiving, by one or more processors associated with the one or more server devices, a uniform resource locator (URL);
   receiving, by one or more processors associated with the one or more server devices, at least two different copies of a document associated with the URL; and
   determining, by one or more processors associated with the one or more server devices, whether a web site corresponding to the URL uses session identifiers based on a comparison of URLs that are within the document and that change between the at least two different copies of the document, where the web site is determined to use session identifiers when a portion of the URLs that change between the at least two different copies of the document is greater than a threshold.

2. The method of claim 1, wherein the document is a home page of the web site.

3. The method of claim 1, further comprising:
extracting, when the URL corresponds to a web site that uses session identifiers, a session identifier from the URL to obtain a clean URL; and
determining whether the URL has already been crawled based on a comparison of the clean URL to a set of clean URLs that represent previously crawled URLs.

4. The method of claim 3, wherein the compared URLs that change include URLs that are local to the web site.

5. The method of claim 3, wherein the session identifiers from the URLs are extracted using rules for the web site.

6. The method of claim 5, wherein the rules are determined automatically.

7. The method of claim 3, further comprising:
receiving the URL as a URL from a previously crawled web document.

8. The method of claim 3, further comprising:
crawling the URL when the URL is determined to not already have been crawled.

9. The method of claim 1, where determining whether the web site corresponding to the URL uses session identifiers is further based on:
determining that the at least two different copies of the document include at least two different versions of a link included in the document; and
determining that the at least two different versions of the link reference a same content.

10. The method of claim 9, where determining that the at least two different versions of the link reference a same content includes:
determining that the content referenced by the link, when fetched using the at least two different versions of the link, includes different color schemes, different advertisement links, or different navigation links.

11. A method for identifying web sites that use session identifiers, performed by one or more server devices, the method comprising:
downloading, by one or more processors associated with the one or more server devices, at least two different copies of at least one document from a web site;
extracting, by one or more processors associated with the one or more server devices, uniform resource locators (URLs) from the two different copies of the web document;
comparing, by one or more processors associated with the one or more server devices, the extracted URLs of the two different copies of the document; and
determining, by one or more processors associated with the one or more server devices, whether the web site uses session identifiers when the comparison indicates that at least a portion of the URLs change between the two different copies.

12. The method of claim 11, wherein extracting URLs from the two different copies of the document includes extracting only URLs that are local to the web site.

13. The method of claim 11, wherein the document is a home page of the web site.

14. The method of claim 11, further comprising:
analyzing the extracted URLs, when the web site is determined to use session identifiers, to generate at least one rule identifying how the session identifiers are embedded in the URLs.

15. A device comprising:
a memory to store instructions; and
a processor to execute the instructions to implement:
a spider component configured to crawl web documents associated with at least one web site; and
a session identifier component configured to determine whether the web site uses session identifiers based on a comparison of a portion of uniform resource locators (URLs) that change between different copies of at least one web document downloaded from the web site.

16. The device of claim 15, wherein the spider component further comprises:
at least one fetch component configured to download content from a network; and
a content manager configured to extract URLs from the downloaded content.

17. The device of claim 16, wherein the spider component further comprises:
a URL manager configured to store the extracted URLs.

18. The device of claim 15, wherein the at least one web document is a home page of the web site.

19. The device of claim 15, wherein the portion of the URLs that change are identified from URLs that are local to the web site.

20. The device of claim 15, further comprising:
a session rule generator configured to generate rules describing how the web site embeds session identifiers in the at least one web document.

21. A device comprising:
means for downloading at least two different copies of at least one web document from a web site;
means for extracting uniform resource locators (URLs) from the two different copies of the web document;
means for comparing the extracted URLs of the two different copies of the web document; and
means for determining whether the web site uses session identifiers when the comparison indicates that at least a portion of the URLs change between the two different copies.

22. The device of claim 21, wherein the means for extracting URLs from the two different copies of the web document includes means for extracting only URLs that are local to the web site.

23. The device of claim 21, wherein the web document is a home page of the web site.

24. The device of claim 21, further comprising:
means for analyzing the extracted URLs, when the web site is determined to use session identifiers, to generate rules describing how the session identifiers are embedded in the URLs.

25. One or more memory devices containing programming instructions that, when executed by at least one processor cause the processor to perform a method for identifying web sites that use session identifiers, the one or more memory devices including:
one or more instructions to download at least two different copies of at least one document from a web site;
one or more instructions to extract uniform resource locators (URLs) from the two different copies of the document;

one or more instructions to compare the extracted URLs of the two different copies of the web document; and one or more instructions to determine whether the web site uses session identifiers when the comparison indicates that at least a portion of the URLs change between the two different copies.

26. The one or more memory devices of claim 25, wherein the one or more instructions to extract URLs from the two different copies of the web document includes one or more instructions to extract only URLs that are local to the web site.

27. The one or more memory devices of claim 25, wherein the web document is a home page of the web site.

28. The one or more memory devices of claim 25, further comprising:

one or more instructions to analyze the extracted URLs, when the web site is determined to use session identifiers, to generate at least one rule describing how the session identifiers are embedded in the URLs.

29. The one or more memory devices of claim 25, where the one or more instructions to determine whether the web site uses session identifiers include:

one or more instructions to determine that the two different copies of the document include two different versions of a link included in the document; and one or more instructions to determine that the two different versions of the link reference a same content.

30. The one or more memory devices of claim 29, where the one or more instructions to determine that the two different versions of the link reference a same content include:

one or more instructions to determine that the content referenced by the link, when fetched using the two different versions of the link, includes different color schemes, different advertisement links, or different navigation links.

* * * * *